(12) United States Patent
Funaoka et al.

(10) Patent No.: US 10,211,589 B2
(45) Date of Patent: Feb. 19, 2019

(54) LASER APPARATUS AND EXTREME ULTRAVIOLET LIGHT GENERATION APPARATUS

(71) Applicant: MITSUBISHI ELECTRIC CORPORATION, Chiyoda-ku, Tokyo (JP)

(72) Inventors: Kouji Funaoka, Tokyo (JP); Masashi Naruse, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/552,730

(22) PCT Filed: Apr. 20, 2016

(86) PCT No.: PCT/JP2016/062480
§ 371 (c)(1),
(2) Date: Aug. 22, 2017

(87) PCT Pub. No.: WO2016/171158
PCT Pub. Date: Oct. 27, 2016

(65) Prior Publication Data
US 2018/0034228 A1    Feb. 1, 2018

(30) Foreign Application Priority Data

Apr. 20, 2015  (JP) ................... 2015-085970

(51) Int. Cl.
*H01S 3/03*       (2006.01)
*H01S 3/02*       (2006.01)
(Continued)

(52) U.S. Cl.
CPC .............. *H01S 3/03* (2013.01); *H01S 3/0071* (2013.01); *H01S 3/02* (2013.01); *H01S 3/034* (2013.01);
(Continued)

(58) Field of Classification Search
CPC .......... H01S 3/03; H01S 3/2232; H01S 3/041; H01S 3/0071; H01S 3/034; H05G 2/008
(Continued)

(56) References Cited

U.S. PATENT DOCUMENTS

2006/0054767 A1     3/2006  Kemeny
2007/0177282 A1*    8/2007  Makino ................. G02B 7/008
                                                     359/819
(Continued)

FOREIGN PATENT DOCUMENTS

JP          7-153664 A      6/1995
JP        2006-078187 A     3/2006
(Continued)

OTHER PUBLICATIONS

International Search Report (PCT/ISA/210) dated Jul. 19, 2016, by the Japanese Patent Office as the International Searching Authority for International Application No. PCT/JP2016/062480.
(Continued)

*Primary Examiner* — Michael Maskell
(74) *Attorney, Agent, or Firm* — Buchanan Ingersoll & Rooney PC

(57) ABSTRACT

Kinematic mounts have three points having zero degree of freedom, one degree of freedom, and two degrees of freedom, respectively. As viewed from a direction perpendicular to a plane containing the three points, an extension of an entrance optical axis of a laser beam to an amplifying apparatus or an extension of an exit optical axis from the amplifying apparatus is oriented to the point with the zero (Continued)

degree of freedom. A translational direction of the point with the one degree of freedom is oriented to the point with the zero degree of freedom. One of the extension of the entrance optical axis and the extension of the exist optical axis passes on a side closer to the point with the two degrees of freedom with respect to a side of the point with the one degree of freedom.

6 Claims, 6 Drawing Sheets

(51) Int. Cl.
    *H01S 3/00*     (2006.01)
    *H01S 3/034*     (2006.01)
    *H01S 3/041*     (2006.01)
    *H01S 3/223*     (2006.01)
    *H01S 3/23*     (2006.01)
    *H05G 2/00*     (2006.01)

(52) U.S. Cl.
    CPC ............ *H01S 3/041* (2013.01); *H01S 3/2232* (2013.01); *H01S 3/2366* (2013.01); *H05G 2/008* (2013.01)

(58) Field of Classification Search
    USPC .......................................... 250/493.1, 504 R
    See application file for complete search history.

(56) References Cited

U.S. PATENT DOCUMENTS

| | | | |
|---|---|---|---|
| 2013/0105713 A1* | 5/2013 | Watanabe | H05G 2/008 250/504 R |
| 2013/0114215 A1* | 5/2013 | Kawasuji | G02B 7/00 361/728 |
| 2013/0208742 A1 | 8/2013 | Mizoguchi et al. | |

FOREIGN PATENT DOCUMENTS

| | | |
|---|---|---|
| JP | 2007-200958 A | 8/2007 |
| JP | 2007-534910 A | 11/2007 |
| JP | 2008-060261 A | 3/2008 |
| JP | 2011-159901 A | 8/2011 |
| JP | 2012-083141 A | 4/2012 |
| JP | 2012-098674 A | 5/2012 |
| JP | 2012-175006 A | 9/2012 |
| JP | 2013-048202 A | 3/2013 |
| JP | 2013-069655 A | 4/2013 |

OTHER PUBLICATIONS

Written Opinion (PCT/ISA/237) dated Jul. 19, 2016, by the Japanese Patent Office as the International Searching Authority for International Application No. PCT/JP2016/062480.

* cited by examiner

LASER APPARATUS AND EXTREME ULTRAVIOLET LIGHT GENERATION APPARATUS

TECHNICAL FIELD

The present invention relates to a laser apparatus, and more particularly, to a structure of a mount configured to fix the laser apparatus, and to an extreme ultraviolet light generation apparatus using an output laser beam from the laser apparatus.

BACKGROUND ART

As a related-art laser apparatus, there exist a plurality of laser apparatus coupled to each other so as to obtain a large-output laser beam (see, for example, Patent Literature 1).

As a mount structure for the laser apparatus described above, there exists a kinematic mount (see, for example, Patent Literature 2).

It has been known that there is no redundant constraint in the above-mentioned structure, and therefore a force which causes distortion in each of an object to be supported and a support base is not generated even when a difference in thermal deformation is generated therebetween.

Further, there has been proposed a structure in which a laser apparatus is mounted on a kinematic mount having a holding mechanism so that an optical axis is arranged so as to pass on a line connecting zero degree of freedom and one degree of freedom so as to prevent an optical axis change due to thermal expansion (see, for example, Patent Literature 3).

The "degree of freedom" is hereinafter also referred to as "DOF".

CITATION LIST

Patent Literature

[PTL 1] JP 2006-78187 ([0004] to [0005], and FIG. 6)
[PTL 2] JP 2011-159901 (FIG. 1) [PTL 3] JP 2008-60261

SUMMARY OF INVENTION

Technical Problem

In general, the laser apparatus capable of providing a high output has a large size and a large temperature change. Therefore, in a system in which the laser apparatus is mounted, the optical axis is changed due to thermal expansion and contraction of the laser apparatus, with the result that quality of laser light is degraded.

In the case of Patent Literature 3, there is a problem in that movement of the kinematic mount is inhibited by the holding mechanism to cause distortion in the laser apparatus or the support base due to the thermal expansion, with the result that the optical axis is changed.

The present invention has been made to solve the problem described above, and has an object to provide a laser apparatus which does not involve a change of the optical axis and degradation in quality of laser light even when thermal expansion and contraction occur in a structure of a kinematic mount configured to fix the laser apparatus, and to provide an extreme ultraviolet light generation apparatus using an output laser beam from the laser apparatus.

Solution to Problem

In order to achieve the above-mentioned object, according to one embodiment the present invention, there is provided a laser apparatus, including an amplifying apparatus mounted onto a base frame through intermediation of a kinematic mount, in which the kinematic mount contains three points having zero degree of freedom, one degree of freedom, and two degrees of freedom, respectively, in which an extension of an entrance optical axis of a laser beam to the amplifying apparatus or an extension of an exit optical axis of the laser beam from the amplifying apparatus is oriented to a point with the zero degree of freedom as viewed from a direction perpendicular to a plane containing the three points, in which a translational direction of a point with the one degree of freedom is oriented to the point with the zero degree of freedom, and in which one of the extension of the entrance optical axis and the extension of the exit optical axis passes on a side closer to a point with the two degrees of freedom with respect to a side of the point with the one degree of freedom.

Further, according to one embodiment of the present invention, there is provided a laser apparatus, including an amplifying apparatus mounted onto a base frame through intermediation of a kinematic mount, in which the kinematic mount contains three points, each having one degree of freedom, in which a translational direction of each of the three points is oriented to a given point within a triangular plane formed by the three points, and in which an extension of an entrance optical axis of a laser beam to the amplifying apparatus or an extension of an exit optical axis of the laser beam from the amplifying apparatus is oriented to the given point within the triangular plane as viewed from a direction perpendicular to the plane.

In addition, according to one embodiment of the present invention, there is provided an extreme ultraviolet light generation apparatus, including: a chamber having an opening port configured to introduce at least one laser beam to be radiated onto a target substance from the above-mentioned laser apparatus; a reference member on which the chamber is mounted; a laser-beam focusing optical system configured to focus the at least one laser beam onto the target substance supplied to a set region so as to turn the target substance into plasma; and a focusing mirror, which is fixed to the reference member, and is configured to focus extreme ultraviolet light emitted from the target substance turned into the plasma.

Advantageous Effects of Invention

In the laser apparatus according to one embodiment of the present invention, the kinematic mount contains the three points having the zero degree of freedom, the one degree of freedom, and the two degrees of freedom, respectively. The extension of the entrance optical axis of the laser beam to the amplifying apparatus or the extension of the exit optical axis from the amplifying apparatus is oriented to the point with the zero degree of freedom as viewed from the direction perpendicular to the plane containing the three points. The translational direction of the point with the one degree of freedom is oriented to the point with the zero degree of freedom. One of the extension of the entrance optical axis and the extension of the exit optical axis is set to pass on a side closer to the point of the two degrees of freedom with respect to the side of the point of the one degree of freedom. Thus, an offset of the entrance optical axis or the exit optical axis to or from the laser apparatus in a plane direction can be prevented for uniformly thermally expanded components of the laser apparatus. Further, turning to the side of the point with the one degree of freedom can be prevented, and therefore a holding mechanism for the two degrees of freedom is not required. Thus, occurrence of distortion due to holding can be prevented so that a change of the optical axis can be prevented.

DESCRIPTION OF EMBODIMENTS

Laser Apparatus

First, laser apparatus according to embodiments of the present invention are described below with reference to the drawings.

First Embodiment

Figure 1:
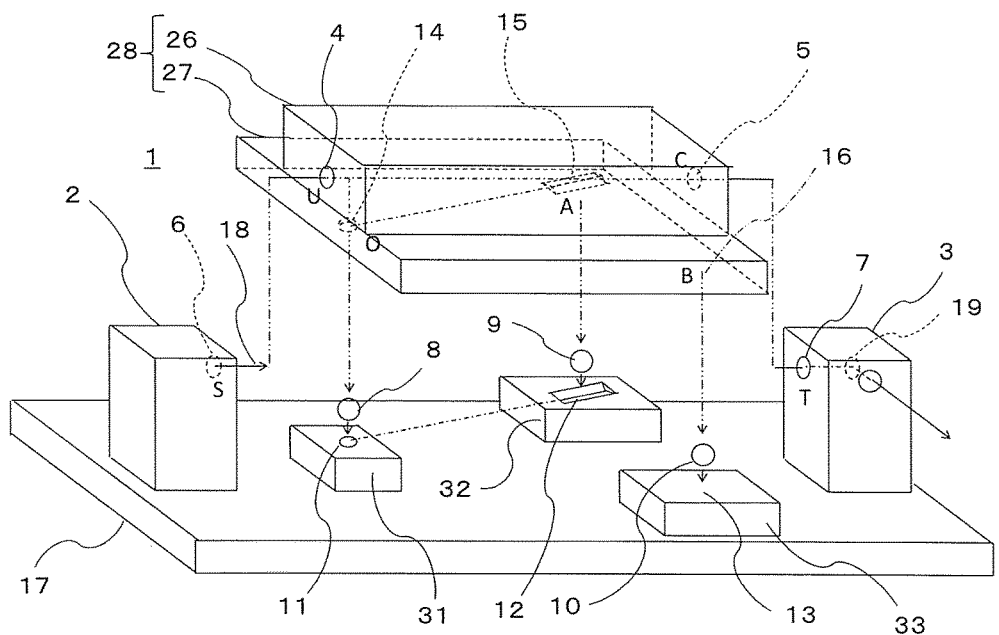
FIG. 1 is a perspective view for illustrating a laser apparatus according to a first embodiment of the present invention.

A laser apparatus 1 according to a first embodiment of the present invention illustrated in FIG. 1 schematically has a structure in which an amplifying unit 26 is mounted onto a base frame 17 through intermediation of kinematic mounts 31 to 33. The amplifying unit 26 is mounted on a frame 27. On the base frame 17, an oscillation apparatus 2 and a laser-beam propagation apparatus 3 are mounted as illustrated in FIG. 1. The amplifying unit 26 and the frame 27 are hereinafter collectively referred to as "amplifying apparatus 28".

<Structure Example of Amplifying Apparatus>

As the amplifying apparatus described above, for example, orthogonal excitation type gas laser apparatus disclosed in WO 2014/156538 and Japanese Patent Application Laid-open No. 2011-159901, which are known in the related-art, can be used.

Figure 8:
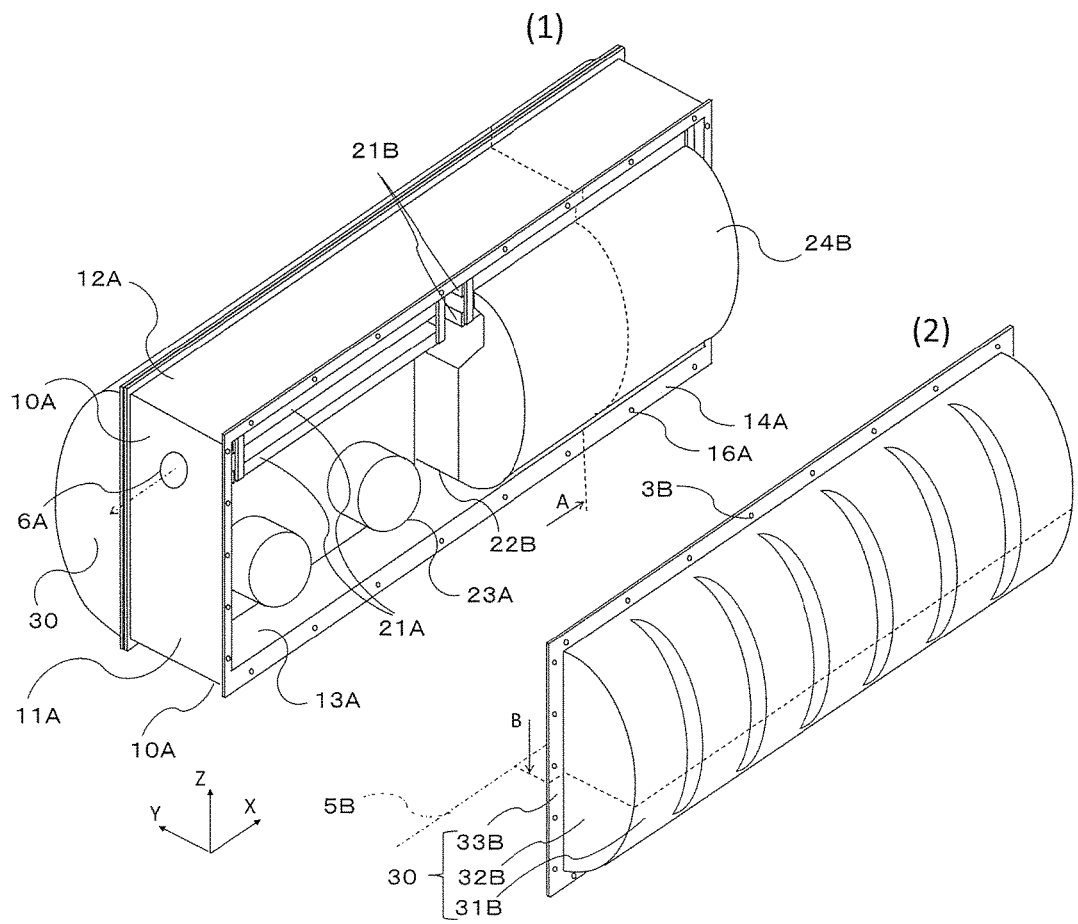
FIG. 8 is a perspective view for illustrating a structure example of an amplifying apparatus of a laser apparatus known in the related art.

For example, the former amplifying apparatus has a structure illustrated in FIG. 8. The amplifying apparatus includes a casing 11A having a sealed structure in which a laser medium gas such as a $CO_2$ gas is sealed. Inside the casing, there are provided discharge electrodes 21A and 21B for laser medium gas discharge excitation, heat exchangers 22A and 22B configured to cool the laser medium gas, and air-sending devices 23A configured to circulate the laser medium gas.

In this example, two pairs are provided for each of the discharge electrodes 21A and 21B, the heat exchangers 22A and 22B, the air-sending devices 23A, and gas ducts 24A and 24B. Specifically, the discharge electrodes 21A and 21B, each having approximately half length of a main body portion 10A in an X-axis direction, are arranged in the X-axis direction. For each of the discharge electrodes 21A and 21B, the heat exchanger, the air-sending devices, and the gas duct are provided. The air-sending devices are arranged so that air-sending directions of the air-sending devices are opposed to each other.

Referring back to FIG. 1, after a laser beam 18 output from a window 6 of the oscillation apparatus 2 enters the amplifying apparatus 28 through an entrance window 4 of the amplifying unit 26 to be amplified in the amplifying unit 26, the laser beam exits from an exit window 5 to enter an entrance window 7 of the laser-beam propagation apparatus 3. Then, through the laser-beam propagation apparatus 3, a high-output laser beam is supplied to a subsequent unit (not shown).

The high-output laser beam described above is used as a driver light source for an extreme ultraviolet (hereinafter abbreviated as "EUV") light source for next-generation exposure apparatus. As examples of the EUV apparatus, in addition to the one disclosed in Japanese Patent Application Laid-open No. 2008-85292, there exists an EUV apparatus disclosed in Japanese Patent Application Laid-open No. 2013-69655 as described later.

The amplifying apparatus 28 with high output is a large heat generator. For the EUV, power as high as 100 KW is input. Most of the power is converted into heat. Therefore, a large-size laser medium cooling system is required. Hence, the amplifying unit 26 has a weight ranging from several hundreds of kg to 1 t, as illustrated in FIG. 8.

Further, when an optical axis is changed due to large thermal expansion in the laser apparatus, the laser beam strikes on an end of an aperture, an end of a window, an end of a mirror, or the like, with the result that a beam profile is degraded. As a result, when the laser apparatus is used as the driver light source for EUV light, degradation of light focusing performance disadvantageously lowers an output of the EUV light. Further, in laser processing, the lowered light focusing performance degrades processing quality.

This point is described later in detail.

<Description of Kinematic Mounts>

The amplifying apparatus 28 is fixed onto the base frame 17 through three points corresponding to the kinematic mounts 31 to 33.

The kinematic mounts 31 to 33 construct a first supporting portion, a second supporting portion, and a third supporting portion described below, respectively, and have a structure in which spherical members 8 to 10 are inserted between the kinematic mounts 31 to 33 and a bottom surface or lower surface 16 of the frame 27, which has a conical or semispherical recessed portion and a V-shaped groove formed thereon, and a rotational component is constrained for none of the three points.

The first supporting portion includes a conical recessed portion 11 formed on an upper surface of the kinematic mount 31, a conical recessed portion 14 formed on the bottom surface 16 of the frame 27 configured to support the amplifying unit 26, and the spherical member 8 inserted in the conical recessed portions 11 and 14, and a motion in a translational direction is constrained to provide no degree of freedom. The zero degree of freedom is herein referred to as "0 DOF".

The second supporting portion includes a V-shaped groove 12 formed on an upper surface of the kinematic mount 32, a V-shaped groove 15 formed on the bottom surface of the frame 27 of the amplifying unit 26, and the spherical member 9 inserted in the V-shaped grooves 12 and 15. The V-shaped grooves 12 and 15 are oriented to a point O constructing the first supporting portion. A motion in a translational direction perpendicular to an AO axis is constrained, and therefore the second supporting portion has one degree of freedom in an AO-axis direction. Herein, the one degree of freedom is referred to as "1 DOF".

The third supporting portion includes an upper surface of the kinematic mount 32, specifically, a flat surface 13, the bottom surface 16 of the frame 27 of the amplifying unit 26, and the spherical member 10 held in contact with the bottom surface 16. The surfaces 13 and 16 are parallel to a plane containing the three points corresponding to the spherical members 8 to 10 on the kinematic mounts 31 to 33. A direction perpendicular to the surfaces 13 and 16 is constrained, and two degrees of freedom in a plane direction are provided. Herein, the two degrees of freedom are referred to as "2 DOF".

It has been known that there is no redundant constraint in the thus constructed kinematic mounts, and therefore a force which causes distortion in the amplifying apparatus 28 or the base frame is not generated in the kinematic mounts even when the amplifying apparatus 28 is thermally expanded.

<Description of Entrance Optical Axis and Exit Optical Axis Oriented to Point O with 0 DOF Constructing First Supporting Portion>

Figure 2:
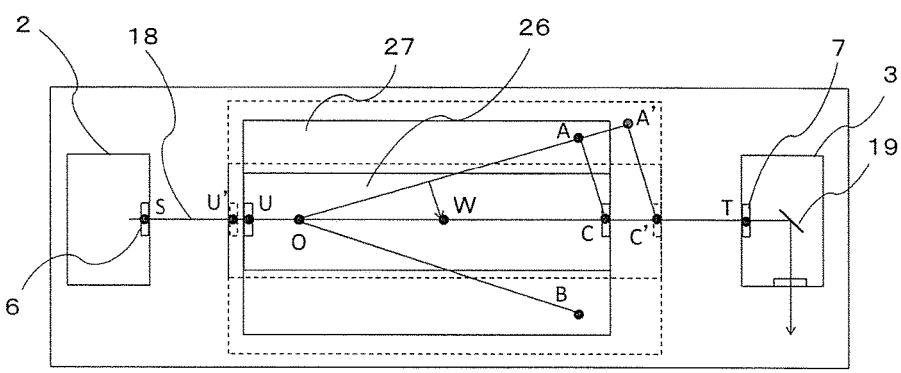
FIG. 2 is a plan view for illustrating a change in the laser apparatus illustrated in FIG. 1, which is caused during thermal expansion.

FIG. 2 is a plan view of FIG. 1 as viewed from an upper direction perpendicular to the plane containing the three points corresponding to the kinematic mounts 31 to 33. A position with the 0 DOF, a position with the 1 DOF, and a position with the 2 DOF are denoted by O, A, and B, respectively. A center position of the window 4 and a center position of the window 5 are denoted by U and C, respectively. Specifically, in the first embodiment, an extension of an entrance optical axis SU to the amplifying unit 26 is set to be oriented to the point O with the 0 DOF. Further, an extension of an exit optical axis CT from the amplifying unit 26 is also set to be oriented to the point O with the 0 DOF.

<Description of Functions of Orientation to 0 DOF>

Functions of the present invention are described with reference to FIG. 2. A shape of the amplifying apparatus 28 after the thermal expansion is indicated by the broken line. A position of the point A and a position of the point C after the thermal expansion are denoted by A' and C', respectively. The point O with the 0 DOF does not move in the translational direction. When uniformly thermally expanded components are considered, a triangle AOC before the expansion and a triangle A'OC' after the expansion have the same ratio of lengths of three sides, and therefore are similar to each other. Therefore, an angle AOC and an angle A'OC' are the same.

Further, the translational direction of the 1 DOF is oriented to the 0 DOF, and hence the point A' is positioned on an extension of a straight line AO. Therefore, it can be said that the point C' is positioned on an extension of a straight line OC connecting the point O. In the first embodiment, the exit optical axis extends on the straight line OC. Thus, the center C' of the exit window is not offset from the exit optical axis OC.

As described above, for the uniformly thermally expanded components, an offset of the entrance optical axis or the exit optical axis in the plane direction described above can be prevented. Therefore, the laser beam does not strike on the end portion of the window, resulting in propagation of the laser beam with high output.

As a result, in laser processing, high processing quality is obtained with a laser beam focused with high accuracy. Further, when the laser beam is used as the driver light source for the EUV light source, high-output EUV light can be obtained because of high light focusing performance.

<Description of Functions of Passage of Entrance Optical Axis and Exit Optical Axis on Side Close to Point with 2 DOF with Respect to Side Close to Point with 1 DOF>

Further, in the first embodiment, the extension of the exit optical axis CT from the amplifying unit 26 or the extension of the entrance optical axis SU to the amplifying unit 26 is set so as to pass on a side closer to the point B with the 2 DOF with respect to the point A with the 1 DOF. Specifically, the point A is not positioned on the side closer to the point B with respect to the point C.

This function is described with reference to FIG. 9 and FIG. 10.

Figure 9:
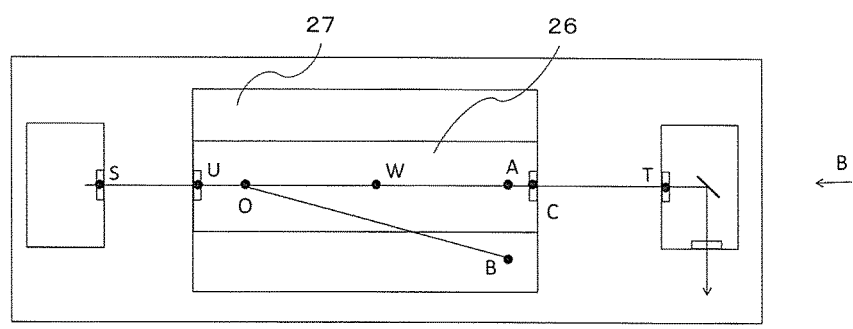
FIG. 9 is a plan view for illustrating a laser apparatus disclosed in Patent Literature 3.
Figure 10:
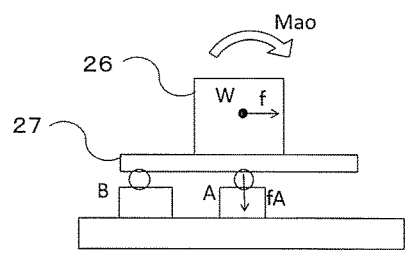
FIG. 10 is a side view of the laser apparatus illustrated in FIG. 9 as viewed from a direction indicated by the arrow B.

FIG. 9 is a view for illustrating a configuration disclosed in Patent Literature 3, in which the extension of the exit optical axis CT passes through the point A with the 1 DOF. FIG. 10 is a view of FIG. 9 as viewed from a direction of the arrow B. Optical components including the amplifying unit 26 positioned on the optical axis are arranged on the straight line OA. When a center of gravity of the amplifying unit 26 is denoted by W, a gravity force acts only on the point A with the 1 DOF and the gravity force does not act on the point B.

When a force f acts due to oscillation in a horizontal direction or the like to generate a rotational moment Mao about the AO axis under this state, the point B with the 2 DOF is lifted up to cause the apparatus to fall down. In order to prevent the apparatus from falling down, a holding mechanism (for example, the structure disclosed in Patent Literature 3) configured to prevent the point B from being lifted up is required. When the mount is held, however, movement of the mount is inhibited to generate a force for deforming the laser apparatus or the base frame. Thus, there arises a problem in that the optical axis is changed due to the deformation. When an apparatus weight is large, in particular, a strong holding mechanism is required. As a result, the problem becomes more noticeable.

In contrast, according to the first embodiment, the extension of the exit optical axis CT is set to pass on the side closer to the point B with the 2 DOF with respect to the point A with the 1 DOF, as illustrated in FIG. 2. Thus, a heavy object such as the amplifying unit 26 arranged on the optical axis can be positioned so as to be located closer to the point B. Therefore, even when the oscillation in the horizontal direction or the like is generated, the heavy object can be prevented from rotating about the AO axis and falling down. Thus, the holding mechanism for the 2 DOF is not required. As a result, the generation of distortion due to holding is prevented, thereby being capable of preventing the change of the optical axis.

The same description applies to the optical axis SU on the entrance side.

In the first embodiment, the laser apparatus is used. However, a total reflection mirror and a partial reflection mirror may be provided in place of the above-mentioned windows to construct an optical resonator so that the apparatus may function as a laser oscillator. Further, any other apparatus may be used as long as the laser beam is used.

Further, the extension of the exit optical axis CT from the amplifying unit 26 or the extension of the entrance optical axis SU to the amplifying unit 26 may be configured to pass on the side closer to the point A with the 1 DOF with respect to the point B with the 2 DOF. In this case, the laser apparatus can also be prevented from falling down about an axis OB, thereby eliminating the need of a holding mechanism for the 1 DOF. Thus, the generation of distortion due to the holding is prevented, thereby being capable of preventing the change of the optical axis.

Briefly, the optical axis only needs to pass between the point A and the point B. The point A is required at least not to be positioned on the side closer to the point B with respect to the point C. Further, it is desirable that the point B be not positioned on the side closer to the point A with respect to the point C.

Second Embodiment

Figure 3:
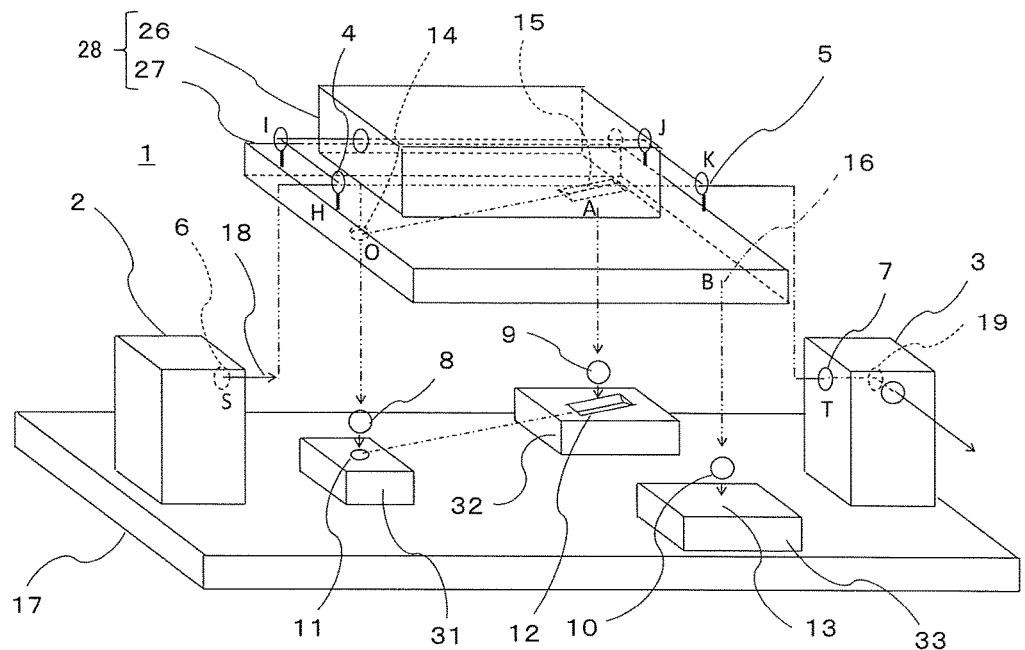
FIG. 3 is a perspective view for illustrating a laser apparatus according to a second embodiment of the present invention.
Figure 4:
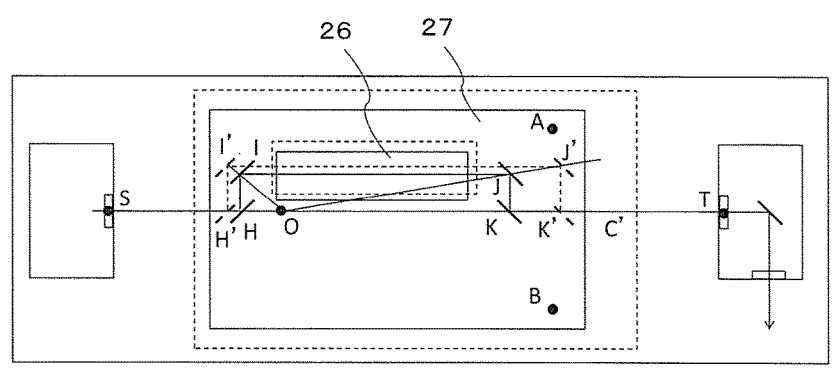
FIG. 4 is a plan view for illustrating a change in the laser apparatus illustrated in FIG. 3, which is caused during the thermal expansion.

FIG. 3 is a view for illustrating a laser apparatus according to a second embodiment of the present invention. FIG. 4 is a plan view as viewed from an upper direction perpendicular to the plane containing the three points corresponding to the kinematic mounts 31 to 33.

In the second embodiment, mirrors H, I, J, and K are arranged on the plane of the frame 27 for the amplifying unit 26 so that an optical path is bent on a horizontal plane. The laser beam entering the laser apparatus exits therefrom via the mirrors H and I, the amplifying unit 26, and the mirrors J and K. Therefore, the amplifying unit 26 is arranged so as to be shifted upward as illustrated in FIG. 3.

In the second embodiment, an extension of an entrance optical axis SH and an extension of an exit optical axis KT are arranged so as to pass through the point O as viewed from the direction perpendicular to the plane containing the three points corresponding to the kinematic mounts 31 to 33. The remaining configuration is the same as that of the first embodiment.

For the laser apparatus according to the first embodiment described above, the movement of the point C after the thermal expansion is described. This movement is achieved at a suitable point on the amplifying apparatus 28. The suitable point after the thermal expansion is positioned on the extension of the line OC that connects the point O and the point C. A degree of extension of a distance from the point O becomes uniform. Specifically, a suitable figure on the amplifying apparatus 28 and a figure after the expansion have a relationship of unrotatable similar figures having the point O as a center. Therefore, the optical path bent by the mirrors forms an unrotatable similar figure having the point O as the center after the expansion and therefore passes through a path indicated by the alternate long and two short dashes line in FIG. 3.

In the second embodiment, the extension of the entrance optical axis and the extension of the exit optical axis are set to pass through the point O. Even after the thermal expansion occurs, the entrance optical axis and the exit optical axis are positioned on the same line as that before the thermal expansion. The change of the optical axes does not occur in the plane direction.

In Patent Literature 3, optical components can be arranged only on a line between the point with the 0 DOF and the point with the 1 DOF. In this configuration, however, the mirrors configured to bend the optical axis are provided. As a result, the optical components can be arranged widely even on a side closer to the point with the 2 DOF to provide a fall-down prevention effect. Thus, the need to hold the kinematic mounts is eliminated. Further, the occurrence of distortion due to the holding can be prevented, and hence the change of the optical axes can be prevented.

Third Embodiment

Figure 5:
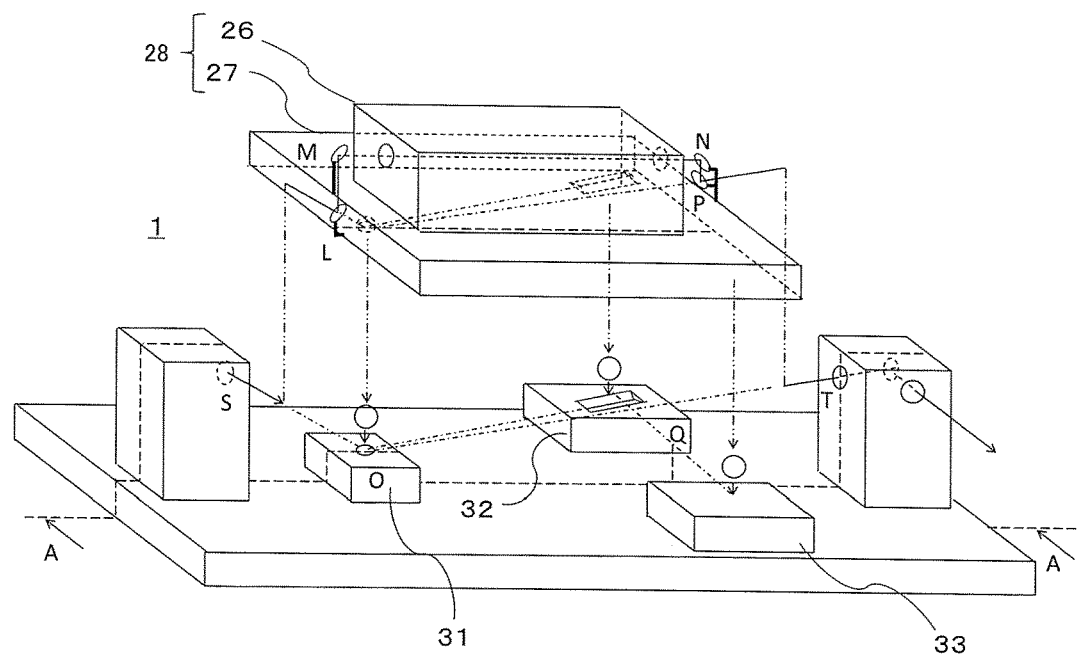
FIG. 5 is a perspective view for illustrating a laser apparatus according to a third embodiment of the present invention.

FIG. 5 is a view for illustrating a laser apparatus according to a third embodiment of the present invention. The laser beam entering the amplifying unit 26 exits therefrom via mirrors L, M, N, and P.

Figure 6:
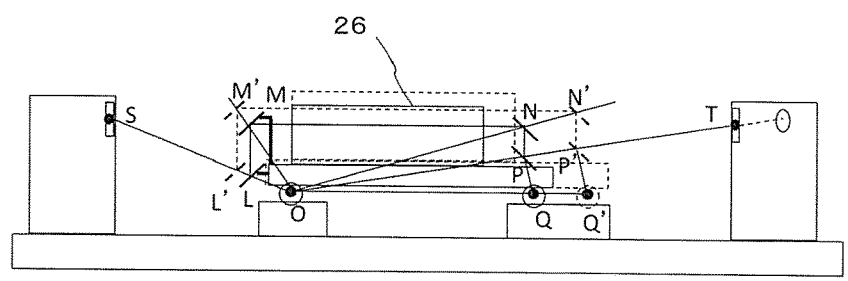
FIG. 6 is a front sectional view of the laser apparatus illustrated in FIG. 5, which is taken along the line A-A.

FIG. 6 is a sectional view which is taken along the line A-A of FIG. 5. The A-A cross section contains an entrance optical axis SL and an exit optical axis PT, and is a plane perpendicular to the plane containing the three points corresponding to the kinematic mounts 31 to 33.

In the third embodiment, in addition to the second embodiment, the extension of the entrance optical axis and the extension of the exit optical axis are oriented in the direction toward the point O with the 0 DOF also in components in a direction perpendicular to the plane containing the three points corresponding to the kinematic mounts 31 to 33.

For functions, when an intersection between a straight line connecting the point with the 1 DOF and the point with the 2 DOF and the plane AA is denoted by Q as illustrated in FIG. 6, a translational direction of the 1 DOF and a translational direction of the 2 DOF are set on the plane containing the three points corresponding to the kinematic mounts 31 to 33 in the third embodiment. Thus, a position Q' of the point Q after the thermal expansion of the amplifying apparatus 28 is on an extension of a straight line OQ connecting the point O, as illustrated in FIG. 6.

As illustrated in FIG. 6, when a suitable point in the optical path of the laser beam inside the amplifying unit 26, for example, a point P is considered, a point P' after the thermal expansion of the amplifying unit 26 has a relationship of a similar figure unrotatable before and after the thermal expansion even on the A-A cross section with the point A in the first embodiment and the second embodiment replaced by the point Q and the point C replaced by the point P. Therefore, the optical path bent by the mirrors forms an unrotatable similar figure having the point O as the center after the thermal expansion, and is as indicated by the broken line in FIG. 5.

In the third embodiment, the extension of the entrance optical axis SL and the extension of the exit optical axis PT pass through the point O. Therefore, even after the thermal expansion, the optical axes are positioned on the same line as that before the thermal expansion. Thus, the occurrence of change of the optical axes can be prevented even on the A-A front cross section.

Fourth Embodiment

Figure 7:
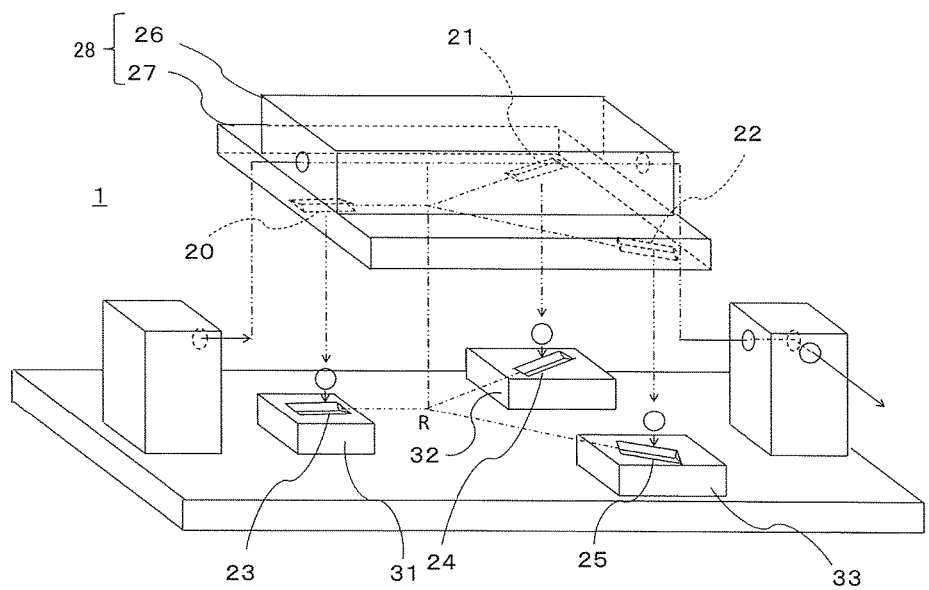
FIG. 7 is a perspective view for illustrating a laser apparatus according to a fourth embodiment of the present invention.

FIG. 7 is a view for illustrating a laser apparatus according to a fourth embodiment of the present invention.

In the first to third embodiments described above, the kinematic mounts 31 to 33 having the 0 DOF, the 1 DOF, and the 2 DOF, respectively, are provided. In the fourth embodiment, three points all with the 1 DOF are used. Translational directions of the points with the 1 DOF at the time of thermal expansion are arranged so as to be oriented to a point R within a triangular plane formed by the points corresponding to the kinematic mounts 31 to 33. The point R is arranged inside the triangle formed by the three points corresponding to the kinematic mounts 31 to 33.

The point R is a point without degree of freedom (0 DOF) in translation. Thus, the point R corresponds to the point O in the first to third embodiments. When the amplifying apparatus 28 is uniformly thermally expanded, the amplifying apparatus 28 after the expansion has a similar figure having the point R as a center. Therefore, as long as the entrance optical axis to the amplifying unit 26 and the exist optical axis from the amplifying unit 26 are oriented to the point R, the same functions and effects as those of the first to third embodiments are obtained.

Further, the point R is arranged inside the triangle formed by the three points corresponding to the kinematic mounts 31 to 33. Therefore, as compared to Patent Literature 3, the optical components can be arranged inside the triangle formed by the three points corresponding to the kinematic mounts 31 to 33. Thus, the fall-down prevention effect can be obtained.

In this manner, the kinematic mounts are not required to be held. The occurrence of the distortion due to the holding is prevented, thereby being capable of preventing the change of the optical axes.

EUV Light Generation Apparatus and Exposure Apparatus

An EUV light generation apparatus using the above-mentioned laser apparatus according to the present invention and an exposure apparatus therefor are described in detail with reference to FIG. 11 and FIG. 12.

<Configuration>

Figure 11:
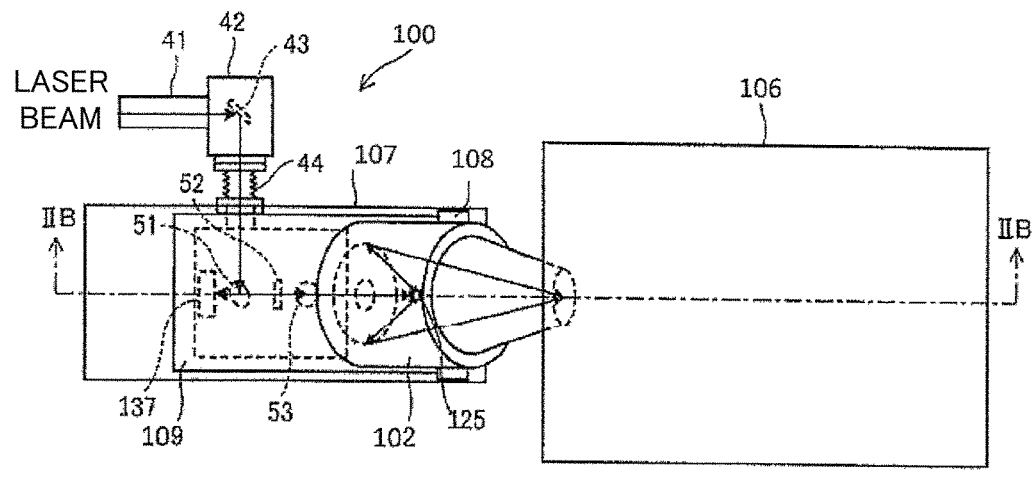
FIG. 11 is a plan view for illustrating an extreme ultraviolet light generation apparatus using an output laser beam from the laser apparatus according to the embodiments of the present invention and an exposure apparatus therefor.
Figure 12:
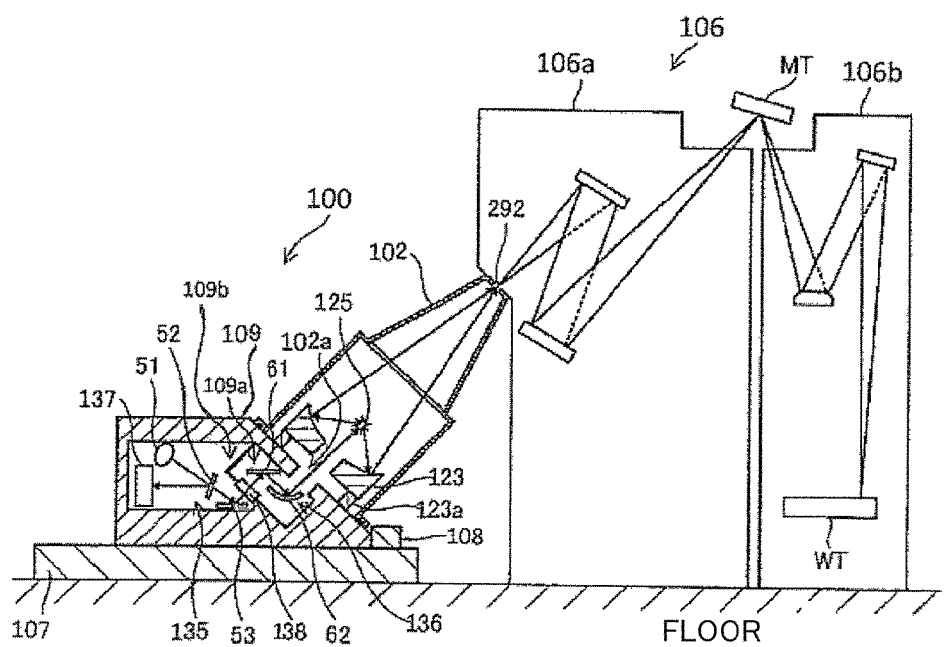
FIG. 12 is a sectional view of the EUV light generation apparatus and the exposure apparatus illustrated in FIG. 11, which is taken along the plane IIB-IIB.

As illustrated in FIG. 11 and FIG. 12, an EUV light generation apparatus 100 includes a movable mechanism 107, a positioning mechanism 108, a chamber reference member 109, a laser-beam introduction optical system 135, a laser-beam focusing optical system 136, a laser-beam measurement device 137, and a chamber 102. A surface of a floor illustrated in FIG. 12 is a reference surface on which the ECU light generation apparatus 100, an exposure apparatus 106, and the like are installed. The chamber reference member 109 is supported by the movable mechanism 107 installed on the surface of the floor being the reference surface. In this manner, a main portion of the EUV light generation apparatus 100 is movable together with the movable mechanism 107 with respect to the exposure apparatus 106. After the chamber reference member 109 is positioned by the positioning mechanism 108, the EUV light generation apparatus 100 is connected to the exposure apparatus 106.

As illustrated in FIG. 12, an opening port 102*a* configured to introduce the laser beam according to each of the embodiments of the present invention to be radiated onto a target substance is formed through the chamber 102. The chamber 102 is mounted on the chamber reference member 109 so that the opening port 102*a* is covered with the chamber reference member 109. For example, an inclined surface is formed on the chamber reference member 109, and the chamber 102 is fixed to the inclined surface of the chamber reference member 109.

A target supply device (not shown) is mounted to the chamber 102. Inside the chamber 102, an EUV focusing mirror 123 is arranged. The target supply device is fixed to the chamber 102 and is configured to supply a target to a plasma generation region 125.

It is preferred that the EUV focusing mirror 123 be fixed to the chamber reference member 109 through intermediation of an EUV focusing mirror holder 123*a*. When the EUV focusing mirror 123 is fixed to the chamber reference member 109, accuracy of a position, a posture, and the like of the EUV focusing mirror 123 is increased based on the chamber reference member 109 as a reference, while fluctuations in position, posture, and the like can be suppressed. Therefore, when the position of the chamber reference member 109 with respect to the exposure apparatus 106 is precisely adjusted, the position of the EUV focusing mirror 123 with respect to the exposure apparatus 106 is also precisely adjusted.

Further, it is also preferred that optical elements including the laser-beam introduction optical system 135, the laser-beam focusing optical system 136, and the laser-beam measurement device 137 be fixed to the chamber reference member 109. Similarly to the EUV focusing mirror 123, when the laser-beam focusing optical system 136 is fixed to the chamber reference member 109, accuracy of a relative position, a posture, and the like of the laser-beam focusing optical system 136 with respect to the EUV focusing mirror 123 can be increased, while fluctuations in position, posture, and the like can be suppressed. Therefore, a position at which the laser beam is focused by the laser-beam focusing optical system 136 can be precisely set with respect to the EUV focusing mirror 123.

Further, when the laser-beam introduction optical system 135 is fixed to the chamber reference member 109, accuracy of a relative position, a posture, and the like of the laser-beam introduction optical system 135 with respect to the laser-beam focusing optical system 136 is increased, while fluctuations in position, posture, and the like can be suppressed. Therefore, a position at which the laser beam is incident on the laser-beam focusing optical system 136 can be precisely set. In addition, when the laser-beam measurement device 137 is fixed to the chamber reference member 109, accuracy of a relative position, a posture, and the like of the laser-beam measurement device 137 with respect to the laser-beam introduction optical system 135 is increased, while fluctuations in position, posture, and the like can be suppressed. Therefore, a cross-sectional intensity profile, pointing, a spread angle, and the like of the laser beam supplied through the laser-beam introduction optical system 135 can be precisely measured.

In order to accommodate the optical elements including the laser-beam introduction optical system 135, the laser-beam focusing optical system 136, and the laser-beam measurement device 137, the chamber reference member 109 includes an accommodation chamber 109*a* being in communication with the opening port 102*a* of the chamber 102 through a through hole and an accommodation chamber 109*b* adjacent to the accommodation chamber 109*a*. A window 138 is formed between the accommodation chamber 109*a* and the accommodation chamber 109*b*. With the window, a pressure inside the chamber 102 is maintained, while a gas in the chamber 102 is sealed. For example, the laser-beam focusing optical system 136 is arranged in the accommodation chamber 109*a*, and the laser-beam introduction optical system 135 and the laser-beam measurement device 137 are arranged in the accommodation chamber 109*b*.

An optical unit 42 is mounted to the chamber reference member 109 through flexible tubes 44. An optical path tube 41 is connected to the optical unit 42, while at least one highly-reflective mirror 43 is arranged in the optical unit 42. For example, a laser beam output from the laser apparatus according to each of the embodiments described above passes through the optical path tube 41 toward the optical unit 42.

In the optical unit 42, the laser beam passing through the optical path tube 41 is reflected by the highly-reflective mirror 43 toward the accommodation chamber 109b of the chamber reference member 109, thereby supplying the laser beam to the laser-beam introduction optical system 135.

The laser-beam introduction optical system 135 is configured to introduce the laser beam supplied via the optical unit 42 into the accommodation chamber 109a of the chamber reference member 109 through the window 138. The laser-beam introduction optical system 135 includes a highly-reflective mirror 51, a beam splitter 52, a highly-reflective mirror 53, and holders configured to hold the mirrors and the beam splitter.

The highly-reflective mirror 51 reflects the laser beam supplied via the optical unit 42 toward the beam splitter 52. The beam splitter 52 transmits, with high transmissivity, the incident laser beam toward the highly-reflective mirror 53 and reflects a part of the incident laser beam toward the laser-beam measurement device 137. The highly-reflective mirror 53 reflects the incident laser beam toward the window 138 and the laser-beam focusing optical system 136.

The laser-beam focusing optical system 136 is configured to focus the laser beam introduced into the accommodation chamber 109a by the laser-beam introduction optical system 135 onto the target supplied from the target supply device to the plasma generation region 125. The laser-beam focusing optical system 136 includes a highly-reflective mirror 61, a laser-beam focusing mirror 62, and holders configured to hold the mirrors.

The highly-reflective mirror 61 reflects the laser beam supplied from the laser-beam introduction optical system 135 toward the laser-beam focusing mirror 62. The laser-beam focusing mirror 62 may be, for example, an off-axis parabolic mirror, and is configured to focus the incident laser beam onto the plasma generation region 125. In the plasma generation region 125, the laser beam is radiated onto the target substance to turn the target substance into plasma. As a result, EUV light can be generated.

The EUV focusing mirror 123 is fixed to the inclined surface of the chamber reference member 109 through intermediation of the EUV focusing mirror holder 123a inside the chamber 102. The EUV focusing mirror 123 may be, for example, a mirror with a reflecting surface having a spheroidal shape, and is arranged so that a first focal point is positioned on the plasma generation region 125 and a second focal point is positioned at an intermediate focus (IF) 292.

The exposure apparatus 106 includes a mask irradiation section 106a and a workpiece irradiation section 106b. The mask irradiation section 106a is an optical system configured to irradiate a mask on a mask table MT with the EUV light, and is constructed as a reflective optical system including a plurality of highly-reflective mirrors. The workpiece irradiation section 106b is an optical system configured to project an image of a mask onto a workpiece (such as a semiconductor wafer) on a workpiece table WT, and is constructed as a reflective optical system including a plurality of highly-reflective mirrors.

<Operation>

The laser beam output from the laser apparatus according to each of the embodiments described above is reflected by the highly-reflective mirror 43 of the optical unit 42 to be incident on the highly-reflective mirror 51 of the laser-beam introduction optical system 135. The laser beam reflected by the highly-reflective mirror 51 is incident on the beam splitter 52. Most of the laser beam incident on the beam splitter 52 is transmitted through the beam splitter 52 to be incident on the highly-reflective mirror 53. A part of the laser beam incident on the beam splitter 52 is reflected by the beam splitter 52 to be incident on the laser-beam measurement device 137. The laser-beam measurement device 137 measures a cross-section intensity profile, pointing, a spread angle, and the like of the laser beam.

The laser beam reflected by the highly-reflective mirror 53 is incident on the laser-beam focusing optical system 136 through the window 138. The laser beam transmitted through the window 138 is reflected by the highly-reflective mirror 61 and the laser-beam focusing mirror 62 of the laser-beam focusing optical system 136 to pass through the through hole formed in the chamber reference member 109 to enter the opening port 102a of the chamber 102. Further, the laser beam entering the opening port 102a passes through a through hole formed in the EUV focusing mirror 123 to be focused on the plasma generation region 125.

The laser beam focused on the plasma generation region 125 is radiated on the target substance output from the target supply device to be supplied to the plasma generation region 125. As a result, the target substance is turned into the plasma so that the EUV light can be generated. The generated EUV light is focused to the intermediate focus 292 by the EUV focusing mirror 123 to enter the exposure apparatus 106.

In the exposure apparatus 106, the EUV light focused on the intermediate focus 292 is radiated on the mask placed on the mask table MT by the mask irradiation section 106a through a reflective optical system. Further, the EUV light reflected by the mask forms an image on the workpiece (such as the semiconductor wafer) placed on the workpiece table WT by the workpiece irradiation section 106b through the reflective optical system. By simultaneously moving the mask table MT and the workpiece table WT in parallel, a pattern of the mask can be transferred onto the workpiece.

REFERENCE SIGNS LIST 1 laser apparatus, 2 oscillation apparatus, 3 laser-beam propagation apparatus, 4 entrance window of laser apparatus, 5 exit window of laser apparatus, 6 entrance window of oscillation apparatus, 7 entrance window of laser-beam propagation apparatus, 8 to 10 spherical member for DOF, 11 conical recessed portion, 12 V-shaped groove, 13 flat surface, 14 conical recessed portion, 15 V-shaped groove, 16 flat surface, 17 base frame, 18 laser beam, 19 mirror, 20 to 25 V-shaped groove, 26 amplifying unit, 27 frame, 28 amplifying apparatus, 31 to 33 kinematic mount, optical unit, 51 highly-reflective mirror, 62 laser-beam focusing mirror, 100 extreme ultraviolet (EUV) light generation apparatus, 102 chamber, 106 exposure apparatus, 107 movable mechanism, 108 positioning mechanism, 109 chamber reference member, 123 EUV focusing mirror, 125 plasma generation region, 125, 136 laser-beam focusing optical system

The invention claimed is:

1. A laser apparatus, comprising an amplifying apparatus mounted onto a base frame through intermediation of a kinematic mount, wherein the kinematic mount contains three points having zero degree of freedom, one degree of freedom, and two degrees of freedom, respectively, wherein an extension of an entrance optical axis of a laser beam to the amplifying apparatus and an extension of an exit optical axis of the laser beam from the amplifying apparatus is oriented to the point with the zero degree of freedom as viewed from a direction perpendicular to a plane containing the three points, and is oriented to be spaced apart from at least one of the point with one degree of freedom and the point with two degrees of freedom as viewed from a direction perpendicular to the plane containing the three points, wherein a translational direction of the point with the one degree of freedom is oriented to the point with the zero degree of freedom, and wherein one of the extension of the entrance optical axis and the extension of the exit optical axis passes between the point with the two degrees of freedom and the point with the one degree of freedom.

2. A laser apparatus according to claim 1, wherein one of the extension of the entrance optical axis and the extension of the exit optical axis further passes on the side closer to the one degree of freedom with respect to the side of the two degrees of freedom.

3. A laser apparatus according to claim 1, further comprising a mirror, which is provided on a horizontal plane of a frame constructing the amplifying apparatus, and is configured to bend an optical path so as to be positioned out of the extension of the entrance optical axis and the extension of the exit optical axis.

4. A laser apparatus according to claim 1, further comprising a mirror, which is provided on a vertical plane of a frame constructing the amplifying apparatus, and is configured to bend an optical path so as to be positioned out of the extension of the entrance optical axis and the extension of the exit optical axis.

5. A laser apparatus according to claim 4, wherein one of the extension of the entrance optical axis and the extension of the exit optical axis is oriented to the point with the zero degree of freedom as viewed from a direction perpendicular to the plane containing the three points.

6. An extreme ultraviolet light generation apparatus, comprising:
a chamber having an opening port configured to introduce at least one laser beam to be radiated onto a target substance from the laser apparatus of claim 1;
a reference member on which the chamber is mounted;
a laser-beam focusing optical system configured to focus the at least one laser beam onto the target substance supplied to a set region so as to turn the target substance into plasma; and
a focusing mirror, which is fixed to the reference member, and is configured to focus extreme ultraviolet light emitted from the target substance turned into the plasma.

* * * * *